United States Patent [19]

Love et al.

[11] 4,388,534

[45] Jun. 14, 1983

[54] UNINTERRUPTIBLE POWER SUPPLY

[75] Inventors: Roger R. Love, Florham Park; John Metroke, Oxford, both of N.J.

[73] Assignee: Computer Power, Inc., High Bridge, N.J.

[21] Appl. No.: 291,926

[22] Filed: Aug. 11, 1981

[51] Int. Cl.³ .............................................. H02J 9/06
[52] U.S. Cl. ..................................................... 307/66
[58] Field of Search ............................. 307/64, 66, 67

[56] References Cited

U.S. PATENT DOCUMENTS

| | | | |
|---|---|---|---|
| 3,609,386 | 9/1971 | Patlach | 307/66 |
| 3,614,461 | 10/1971 | Speer et al. | 307/66 X |
| 4,122,359 | 10/1978 | Breikss | 307/64 |
| 4,143,283 | 3/1979 | Graf et al. | 307/66 |
| 4,181,842 | 1/1980 | Elias et al. | 307/66 |
| 4,209,710 | 6/1980 | Quarton | 307/66 |

FOREIGN PATENT DOCUMENTS 2408237  6/1979  France ................................. 307/66

*Primary Examiner*—Donald A. Griffin
*Attorney, Agent, or Firm*—Darby & Darby

[57] ABSTRACT

An interruptible power supply can supplant a primary power source with a secondary power source such as a battery when the primary power source fails. The supply has a switching device, an inverter and a pair of output terminals. The inverter is coupled to the output terminals. The inverter can couple electrical energy from the battery to the pair of output terminals. The switching device is responsive to the presence of electrical potential at the primary power source for coupling and decoupling the primary power source or the secondary power source to the output terminals. The switching device can also provide a current path from the primary source to the output terminals, which bypasses the inverter. A force commutation device responds to the voltage at the primary power source for driving the switching device, causing it to decouple the primary power source from the output terminals.

10 Claims, 7 Drawing Figures

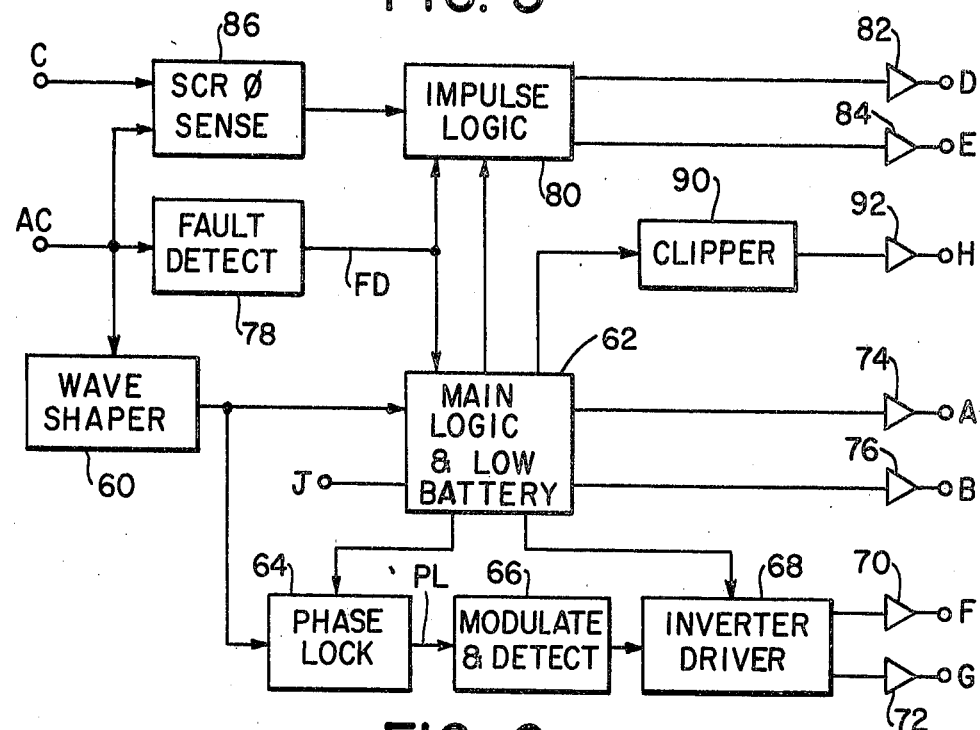
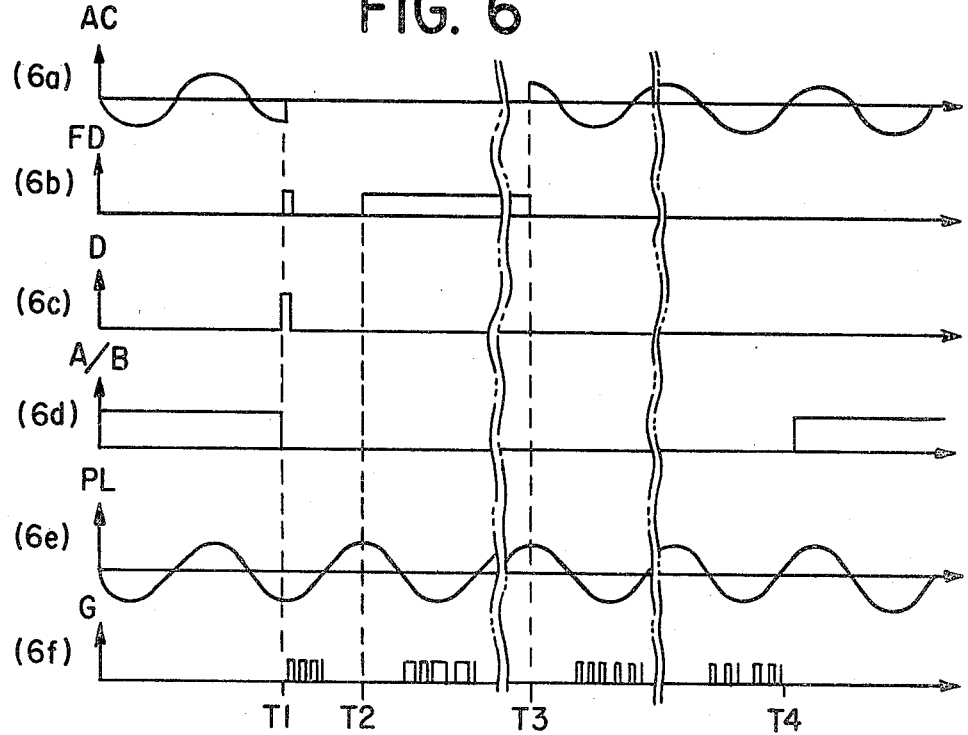

UNINTERRUPTIBLE POWER SUPPLY

BACKGROUND OF THE INVENTION

The present invention relates to uninterruptible power supplies and in particular, to a power supply that can directly couple a utility line to a pair of output terminals without passing that power through an inverter.

One type of presently available uninterruptible power supply employs a battery directly charged by utility lines. The battery in turn continuously powers an inverter to produce an alternating current on its output. Therefore, when the utility lines fail, the battery, retaining its charge, continues to energize the inverter so that power is not interrupted. A known inverter drives a transformer with a pulse train having a varying duty cycle. This duty cycle varies sinusoidally to construct a sine wave power output.

Also known is an off-line inverter which is connected to the primary of a ferroresonant transformer in conjunction with the A.C. utility. This dual primary transformer normally receives its power input from either the A.C. utility or the inverter. The ferromagnetic transformer's inherent energy storage capability supplies the load energy during the finite time it takes to switch between the utility and inverter and vice versa.

Another type of known uninterruptible supply uses line thyristors which are rendered non-conductive through self-commutation. This self-commutation requires passage of approximately one half of a power cycle before the line thyristors cease conducting. Especially with inductive loads, current may continue to flow even though the utility power has failed and triggering stopped. Consequently this inverter cannot replace the utility power until the passage of considerable time: when the line thyristors have ceased conducting. This delay causes undesirable transients in the supply output. The circuits described in U.S. Pat. Nos. 3,293,446 and 3,344,282 of Baude are illustrative of known uninterruptible power supplies utilizing line thyristors.

Another disadvantage associated with some conventional uninterruptible power supplies is a power loss resulting from a double conversion of the form of electrical energy: transformation from alternating to direct and then from direct to alternating current. In the case of the dual primary unit, a single conversion with a high loss ferromagnetic transformer is required. In either case, efficiencies of over 90% are rare. Accordingly, there is a need for a simple highly efficient uninterruptible power supply with a fraction of the losses presently generated in the known systems.

SUMMARY OF THE INVENTION

In accordance with an illustrative embodiment demonstrating features and advantages of the present invention, there is provided an uninterruptible power supply operable to supplant a failed primary power source with a secondary power source such as a battery when the primary power source fails. The supply has a pair of output terminals, an inverter means and a switching means. The inverter means is coupled to the output terminals for coupling electrical energy from the battery to the pair of output terminals. The switching means is responsive to the presence of electrical potential at the primary power source. The switching means can couple and decouple the primary power source to the output terminals. The switching means also can provide a current path from the primary power source to the output terminals which bypasses the inverter means. An energy storage means responds to the voltage at the primary power source for driving the switching means, causing it to decouple the primary power source from the output terminals.

The above power supply can switch energy directly from a utility line to output terminals without routing through the inverter. By bypassing the inverter, the transfer efficiency can be as high as the transfer efficiency of the switch employed. In a preferred embodiment, a pair of thyristors connected in antiparallel are used as triggered saturated switches dissipating very little energy. This structure results in only about ¼ the normal losses encountered in the present state of the art resulting in a normal transfer efficiency of about 98%.

When a utility line fails, it normally falls to zero volts and would thereby tend to cause a large return of stored energy into the utility line which would in turn discharge any energy storage circuit. For this reason, the preferred embodiment also has an inductor serially connected between these thyristors and the energy storage portion of the uninterruptible power supply. This inductor is useful for preventing the discharge of current through the thyristors when the utility line fails.

Preferably, these thyristors are both switched "off" by forced commutation. If this forced commutation is not used, then the thyristors must self-commutate off before the inverter can be started which will cause an interruption of power for one half of a cycle or so and/or the dissipation back into the utility lines of energy stored in an LC network included for smoothing transients. In either case, (or in some combination of the two cases) there will be an interruption of the output wave. In a preferred embodiment, the line thyristors are quickly driven out of conduction by a pair of voltage storing capacitors oppositely charged by two respective voltage doubling circuits. Upon sensing the failure of the utility line, the apropriate storage capacitor is connected by a semiconductor switch to the then conducting thyristor, ending its conduction.

Also in a preferred embodiment, an inverter employs a magnetic transformer tuned by a parallel capacitor to ring at line frequency. The transformer is driven by a pulse train whose duty cycle varies sinusoidally to reconstruct an alternating current power output. This magnetic device may be connected directly to the output terminals of the supply to further increase efficiency and avoid the need for additional switching devices. Preferably, this inverter can employ a clipper switched to the ferromagnetic transformer to eliminate high amplitude, sharp transients that may be produced by the pulsing of the inverter. This clipper can have a capacitor that is charged to the nominal peak value of the inverter output but can absorb by means of clipping diodes, pulses exceeding that nominal peak.

BRIEF DESCRIPTION OF THE DRAWINGS

The above brief description as well as other objects, features and advantages of the present invention will be more fully appreciated by reference to the following detailed description of a presently preferred but nonetheless illustrative embodiment in accordance with the present invention when taken in conjunction with the accompanying drawings wherein:

FIG. 5 is a block diagram of the triggering circuit of FIG. 1; and

FIG. 6 is a timing diagram illustrating signals produced in the supply of FIG. 1.

DETAILED DESCRIPTION OF THE PREFERRED EMBODIMENT

Figure 1:
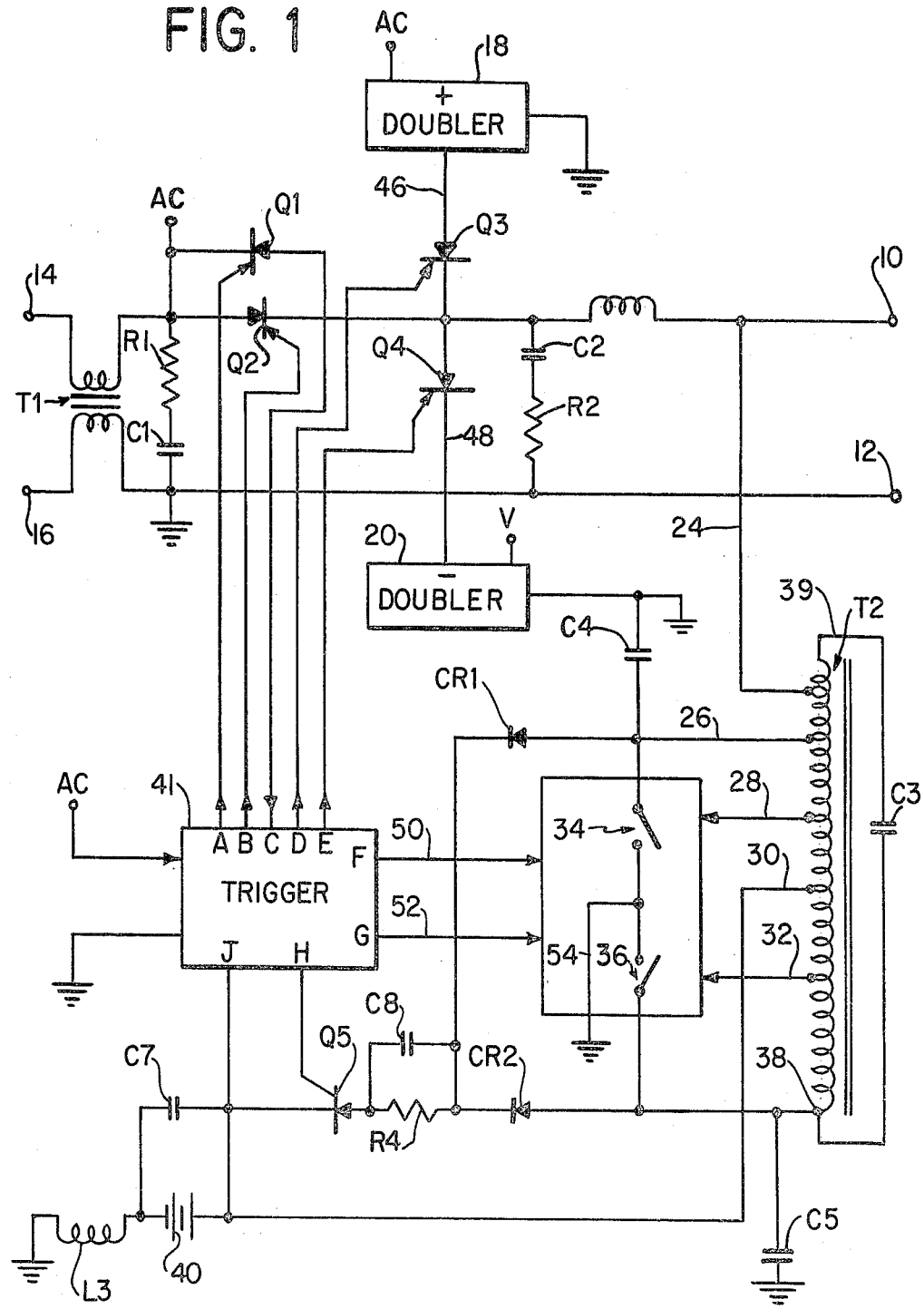
FIG. 1 is a schematic diagram of a power supply according to the present invention.

Referring to FIG. 1, a schematic diagram is given of a power supply having a pair of output terminals 10 and 12, the latter defined as ground. The supply of FIG. 1 receives external power from a primary power source shown herein as utility lines 14 and 16. This primary power is coupled through a filter composed of transformer T1, resistor R1 and capacitor C1. Connected between terminals 14 and AC is one winding of transformer T1 whose other winding is connected between terminal 16 and ground. Resistor R1 and capacitor C1 are serially connected between terminal AC and ground.

A switching means is shown herein as a pair of switching semiconductors, thyristors Q1 and Q2. Thyristors Q1 and Q2 are connected in antiparallel. Specifically, the anode of thyristor Q2 and the cathode of thyristor Q1 are connected to terminal AC. The anode of thyristor Q1 and the cathode of thyristor Q2 are connected to one terminal of an inductive element L1, whose other terminal is connected to output terminal 10. Inductor L1 acts as a filter to eliminate current surges through the system. Another filter is shown herein as resistor R2 and capacitor C2, serially connected between ground and the cathode of thyristor Q2.

A reversing means is shown herein as thyristors Q3 and Q4, their cathode and anode, respectively, being connected to the anode of thyristor Q1. The anode of thyristor Q3 is connected to the output of voltage doubler 18, a circuit driven by previously mentioned terminal AC and ground. A similar voltage doubler 20 is shown connected to the cathode of thyristor Q4, terminal AC and ground. Doublers 18 and 20 are described in further detail hereinafter, as an energy storage means.

An electromagnetic device shown herein as transformer T2 is connected (terminals 38 and 39) in parallel with a capacitive element C3. Transformer T2 has five intermediate taps identified as taps 24, 26, 28, 30 and 32 in that order. Tap 24 is connected to output terminal 10.

An inverter means 33 is schematically shown herein as a pair of switching devices 34 and 36 serially connected between tap 26 and terminal 38 of transformer T2. The switching devices 34 and 36, illustrated in further detail hereinafter, are actuated by input signals on lines 50 and 52. Inverter 33 receives input signals from taps 28 and 32, tap 30 being connected to the positive terminal of battery 40. Terminals 26 and 28 are capacitively connected to ground by smoothing capacitors C4 and C5, respectively. The junction of switching devices 34, 36 are connected to terminal 54 which is grounded. The negative terminal of battery 40 is inductively connected through inductor L3 to ground. Connected in parallel across battery 40 is capacitor C7.

A clipping means is shown herein comprising a pair of unidirectional conducting devices, in this embodiment, diodes CR1 and CR2, whose anodes are separately connected to terminals 26 and 38, respectively. Their cathodes are both connected to one side of the parallel combination of capacitor C8 and resistor R4, its other side being connected to the anode of a semiconductor switch, shown herein as thyristor Q5, whose cathode is connected to the positive terminal of battery 40. The control electrodes of thyristors Q1, Q2, Q3, Q4 and Q5 and lines 50, 51 and 52 are connected to output terminals A, B, D, E, H, F, C and G, respectively, of a pulse width modulator, shown herein as a trigger control 41. Control 41 has as additional inputs, previously mentioned terminal AC, ground and the positive terminal of battery 40. Basically, control 41 provides the timing commands for operating the various semiconductor switches and for providing pulse width modulation for inverter 33. Control 41 couples at an appropriate phase, the potential of terminal AC to the triggers of thyristors Q1 and Q2 causing them to alternately conduct on successive half cycles of the power line frequency of terminal AC. To cease such conduction (for example, during a utility line failure) trigger control 41 ceases supplying triggering signals to the control electrodes of thyristors Q1 and Q2 and instead forwards a triggering signal through to either thyristor Q3 or Q4 to render it conductive and provide a reverse voltage tending to turn off thyristors Q1 and Q2, in a manner to be described hereinafter. As also described hereinafter, control 41 also operates thyristor Q5 to provide clipping and provides on lines 50 and 52 pulse trains having a sinusoidally varying duty cycle to operate inverter 33. While synthesizing a sinewave with such a varying duty cycle is preferred, for less expensive, simplified systems, this synthesized sinewave inverter can be replaced with a simple squarewave inverter. In this case, the inductance of inductor L3 should be substantially increased. This resulting change of wave shape (sinewave to squarewave) would increase the output distortion only slightly when running the inverter due to the filtering effect of inductor L3 and the output autochoke (transformer T2 and capacitor C3). This minor distortion would only occur, of course, when in the emergency or inverter mode.

Figures 2, 3:
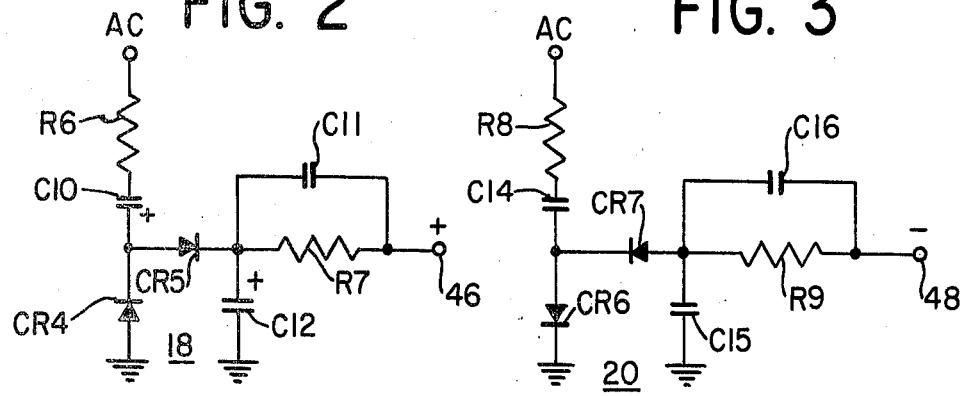
FIG. 2 is a schematic diagram of one of the doublers of the supply of FIG. 1.
FIG. 3 is a schematic diagram of another one of the doublers of the supply of FIG. 1.

Referring to FIG. 2, doubler 18 of FIG. 1 is given in further detail. The series combination of resistor R6 and capacitor C10 are connected between previously mentioned terminal AC and the junction of the anode of diode CR5 and the cathode of diode CR4, the anode of the latter being grounded. A storage means is shown herein as capacitor C12 connected between ground and the cathode of diode CR5. The parallel combination of resistor R7 and capacitor C11 is connected between the cathode of diode CR5 and terminal 46 which corresponds to the line connected to the anode of thyristor Q3 in FIG. 1.

Referring to FIG. 3, a more detailed schematic diagram is given of doubler 20 of FIG. 1. The series combination of resistor R8 and capacitor C14 is connected between (series) previously mentioned terminal AC and the junction of the cathode of diode CR7 and the anode of diode CR6, the cathode of the latter being grounded. Another storage means is shown herein as capacitor C15 connected between the anode of diode CR7 and ground. The parallel combination of capacitor C16 and resistor R9 is connected between the anode of diode CR7 and output terminal 48. Terminal 48 corresponds to that line connected to the cathode of thyristor Q4 in FIG. 1.

Figure 4A:
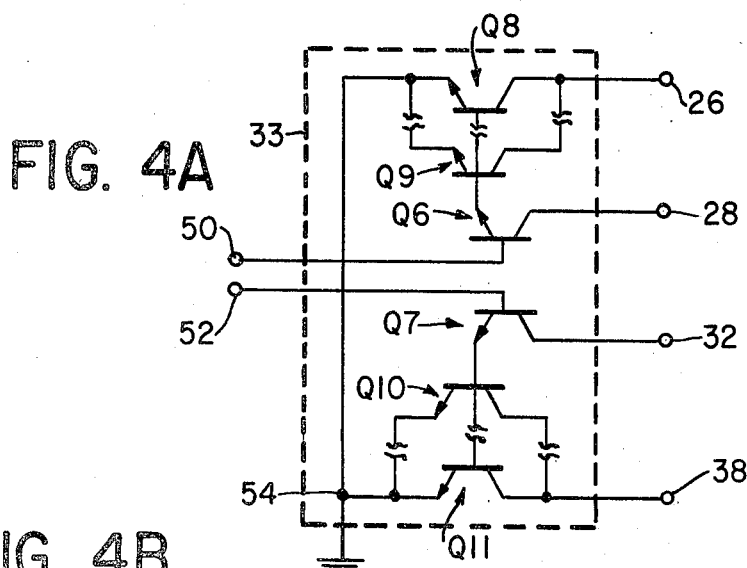
FIG. 4A is a schematic diagram of a transistorized switching device of FIG. 1.

Referring to FIG. 4A, a more detailed schematic diagram is given of inverter 33 of FIG. 1. Terminals 26, 28, 32, 38, 50, 52 and 54 of this figure correspond to the similarly identified terminals in FIG. 1. Terminal 54 is connected to ground. Inverter 33 has a pair of NPN transistors Q6 and 7, whose bases connect to terminals 50 and 52, respectively, their collectors to terminals 28 and 32, respectively. Parallel arrangements of integrated transistors are shown herein as transistor group Q8-Q9 and group Q10-Q11. In practical embodiments these transistor groups contain more than two transistors, the specific number chosen depending upon the total current to be switched, power rating, etc. The broken lines between these transistors serve to suggest the fact that there are more transistors connected in parallel to those illustrated. These well-known transistor groups are high current devices having common emitters, collectors and bases. The common emitters of transistors Q8-Q9 and Q10-Q11 are connected together at terminal 54. The common collectors of transistors Q10-Q11 are connected to terminal 38. The common bases of transistors Q8-Q9 are connected to the emitter of transistor Q6 and the common bases of transistors Q10-Q11 are connected to the emitter of transistor Q7. It will be appreciated that if an energizing potential is applied to terminals 28 and 32, transistors Q6 and Q7 act as emitter followers for driving parallel transistors Q8-Q9 and Q10-Q11 as switching transistors.

Referring to FIG. 5, a more detailed block diagram is given of trigger circuit 41 of FIG. 1. Shown herein is a waveshaper 60 having an input connected to utility line input AC to produce an output square wave in phase with the utility line. This output is connected to a main logic and low battery circuit 62 and a phase locked loop 64. Phase locked loop 64 produces on its output line PL a sinusoidal output locked, in phase, with the output of waveshaper 60. A command to operate phase locked loop 64 is applied thereto from main logic circuit 62. Line PL is an input to a combined modulator and detector 66. This device responds to the signal on line PL to synchronously produce a pulse train whose duty cycle varies according to the amplitude of line PL. This signal together with a signal signifying zero crossings are applied to inverter driver 68 which applies a pair of outputs that are 180° out of phase, to amplifiers 70 and 72 and their output terminals F and G, respectively. Inverter driver 68 also receives an actuating input from main logic circuit 62.

A fault signal can be produced from fault detector 78 upon failure of the utility line signal on terminal AC. Detector 78 has one channel for sensing the presence of power on a long term basis and another channel which quickly responds to rapid failures of line voltage. If one or both channels signal a failure, a high signal is produced from detector 78 on line FD which is applied to logic device 62 and to impulse logic circuit 80. Main logic circuit 62 responds to the square wave output from waveshaper 60 (if no fault signal on line FD) to produce a pair of outputs that are applied to driving amplifiers 74 and 76. The outputs from amplifiers 74 and 76, designated as terminals A and B, respectively, are pulsed high when logic circuit 62 senses that utility line power is present and no other faults have occurred.

Impulse logic circuit 80 has an input from logic circuit 62, and a pair of outputs that drive amplifiers 82 and 84, whose output terminals are identified as terminals D and E, respectively. A pulse is applied to one of the latter amplifiers when the utility line fails, to actuate the voltage reversing thyristors Q3 and Q4 (FIG. 1). Impulse logic circuit 82 receives phasing information for determining which of its two outputs are to be actuated from a phase sensor 86 driven by its previously described input terminal C and utility line AC.

To facilitate an understanding of the principles associated with the present invention, its operation will be briefly described. It will be initially assumed that utility lines 14–16 are transmitting power which is filtered and transferred through transformer T1 to terminal AC and ground (FIG. 1). Accordingly, when the potential at terminal AC becomes positive, trigger control 41 produces a positive-going pulse on its terminal B, triggering thyristor Q2 so it forwardly conducts. Accordingly, current flows from terminal 14 through thyristor Q2 and inductor L1 to terminal 10. Return current flows from terminal 12 to terminal 16. At the start of the next half cycle of the utility line power, the potential across thyristor Q2 is reversed, turning that thyristor off. At this time, trigger control 41 applies (terminal A) to the trigger electrode of thyristor Q1 a positive-going pulse thereby turning that thyristor on. Accordingly, current flows from terminal 10 through inductor L1 and thyristor Q1 to terminal 14. This alternating current continues in this fashion so long as these utility lines (FIG. 5) maintain an energizing signal on line AC which condition is sensed by fault detector 78 (FIG. 5). It should be noted that there are essentially no dissipative devices in the power carrying lines, it being understood that thyristors Q1 and Q2 are kept in saturation so they dissipate little power. Therefore, the efficiency of the power transfer from utility lines 14–16 to the output lnes 10–12 is relatively high. The filtering performed by resistors R1 and R2 and capacitors C1 and C2 dissipates little power, since those elements are concerned primarily with removing low energy, high frequency pulses.

It will now be assumed that the utility lines fail, essentially causing a short circuit across lines 14–16. It is further assumed that this failure occurs during a negative half cycle when thyristor Q1 is conducting. Such a failure is illustrated as occurring at time T1 on timing diagram 6a of FIG. 6. Consequently, the voltage at terminal AC falls rapidly to zero while the voltage at terminal 10 remains at a negative voltage since transformer T2 rings and its stored electromagnetic energy sustains the output voltage. Consequently, thyristor Q1 is immediately reverse biased and rendered nonconductive. Sensing this condition, fault detector 78 immediately produces a narrow pulse from its high speed channel followed approximately 8 milliseconds later by a steady high signal indicating a failure (diagram oo ot FIG. 6. These signals when applied to main logic circuit 62, causes an actuating signal to be immediately applied to inverter driver 68 (FIG. 5) so at time T1 it produces at terminal F the signals shown in timing diagram 6f of FIG. 6. Simultaneously, a signal 180° out of phase therewith is produced on terminal F. It will be noted that these signals consist of burst of pulses, whose duty cycle within each burst varies sinusoidally. Consequently, inverter 33 (FIG. 1) produces a smoothly varying output signal approximating a sine wave.

Since power is maintained at terminals 10 and 12, terminal AC will lose voltage and become slightly positive. Logic circuit 62 (FIG. 5) may respond to this condition as if a new half cycle of power commenced, applying an actuating signal to terminal B thereby triggering thyristor Q2.. Thyristor Q2 can forwardly conduct since its cathode is coupled to a negative potential. However, once trigger control 41 senses that there has been a failure of the utility lines, triggering of the trigger of thyristor Q1 and Q2 ceases. Cessation of triggering is caused by removal of enabling input signals to amplifiers 74 and 76; as illustrated in diagram 6d of FIG. 6. Then to ensure that thyristor Q2 is off, it is reverse biased as follows: Sensing the failure signal of line FD and a control signal from logic circuit 62, impulse logic circuit 80 produces a pulse at terminal D at time T1 (diagram 6c of FIG. 6). Consequently, thyristor Q3 is rendered conductive which allows the positive voltage stored in doubler 18 to be coupled to the cathode of thyristor Q2. As a result, thyristor Q2 is reverse biased and turned off. It will be noted that this relatively rapid application of a positive, reversing voltage does not disturb the negative voltage at output terminal 10 by virtue of isolating inductor L1. After this positive doubler voltage performs its task, it relaxes as capacitor C11 (FIG. 2) quickly charges. The foregoing completes the disconnecting of the utility lines from output lines 10 and 12. If this forced commutation circuit is not used, then the line thyristors must self-commutate off before the inverter can be started which will cause an interruption of power for one half of a cycle or so and/or the dissipation back into the utility lines of energy stored in the LC network (capacitor C3 and transformer T2).

Since switches 34 and 36 (FIG. 6) operate at a relatively high speed there is a tendency to produce narrow, high amplitude pulses from transformer T2. Such pulses can interfere with the operation of switches 34 and 36. Accordingly, the logic circuit 62 causes clipper circuit 90 to produce a positive-going pulse on terminal H (FIG. 5). As a result, thyristor Q5 is rendered conductive. Consequently, clipping diodes CR1 and CR2 are connected to capacitor C8. Capacitor C8 charges to a voltage corresponding approximately to the peak voltage normally produced at taps 26 and 38. Resistor R4 bleeds capacitor C8 so it is not excessively charged by brief transients. Accordingly, high amplitude transients produced on taps 26 and 38 can be absorbed into capacitor C8.

It will be appreciated, that should the failure occur during a positive half cycle when thyristor Q2 is conducting, operation is similar. However, after thyristor Q2 turns off, thriystor Q4 must now be turned on to reverse bias thyristor Q1.

Inverter 33 (FIG. 1) continues to operate with bursts of pulses being alternately produced from terminals F and G of trigger control 41 on successive half cycles of phase locked loop 64 (FIG. 5). During this mode of operation, phased locked loop 64 is regulated by an internal standard in response to a command from logic circuit 62.

It is now assumed that power is restored during a positive half cycle of the utility line at time T3 (diagram 6a of FIG. 6). In response, failure detector 78 produces a low signal (diagram 6b of FIG. 6) on line FD (FIG. 5). At time T3 the phase locked signal of line PL (FIG. 5 and diagram 6e of FIG. 6) has expectedly drifted out of phase with the utility signal on terminal AC (FIG. 5 and diagram 6a of FIG. 6). Phase coherence is restored as logic circuit 62 transfers control over phase locked loop 64 (FIG. 5) to shaper 60, such coherence being illustrated at time T4 in diagram 6e and 6a. In order to allow sufficient time to achieve this coherence, logic circuit 62 waits about three seconds after utility power is restored (T3) before responding furhter (T4).

Next at time T4 (FIG. 6) enabling signals are applied by logic circuit 62 (FIG. 5) to amplifiers 74 and 76. Consequently, thyristor Q2 (FIG. 1) is triggered, it being a positive half cycle of the utility line. Simultaneously, inverter driver 68 (FIG. 5) is disabled so that it ceases producing pulses. Since the utility line and inverter 33 (FIG. 1) are synchronized, no significant disturbance comes as a result of the transfer. Also at this time, the triggering signal to thyristor Q5 is removed, effectively disconnecting resistor R4 so it doesn't drain power from terminals 10 and 12. Since power is restored, doublers 18 and 20 return to initial conditions as resistors R7, R9 discharge impulse capacitors C11, C16. This restores the system to the originally assumed conditions.

Figure 4B:
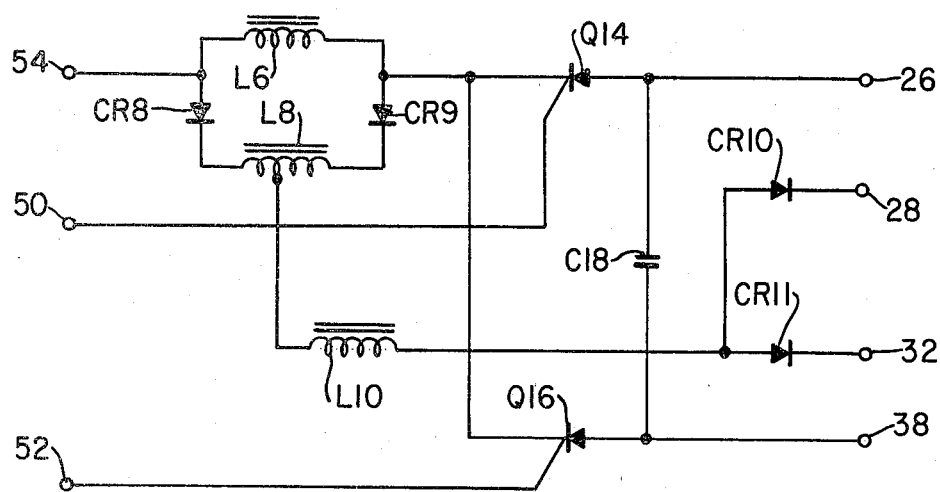
FIG. 4B is a schematic diagram of a switching device which is an alternate to that of FIG. 4B.

Referring to FIG. 4B, it shows a switching circuit which is an alternate to that of FIG. 4A. Terminals 26, 28, 32, 38, 50, 52 and 54 herein correspond to the identically numbered terminals of FIG. 1. Inductor L6 is shown connected between terminal 54 and the cathode of thyristor Q14, whose anode connects to terminal 26. Its trigger terminal connects to terminal 50. The anode of diode CR8 is connected to terminal 54 and its cathode to one end terminal of tapped inductor L8, whose other end terminal connects to the cathode of diode CR9. The anode of diode CR9 connects to the cathodes of thyristors Q14 and Q16. The anode of thyristor Q16 connects to terminal 38 and its trigger terminal to terminal 52. The tap of inductor L8 is connected to one terminal of inductor L10. Its other terminal connects to the anodes of diodes CR10 and CR11, whose cathodes connect to terminals 28 and 32, respectively. A filtering capacitor C18 is connected between terminals 26 and 38.

The circuit of FIG. 4B operates to alternatively switch terminals 26 and 38 to terminal 54. This switching is performed by alternatively triggering thyristors Q14 and Q16 through triggering terminals 50 and 52, respectively. Consequently, current injected into the center tap of the inverter transformer (tap 30 of transformer T2 of FIG. 1) flows through alternative sections of the transformer through either thyristor Q14 or Q16 and returns through ground to the negative terminal of the battery.

In the event the load is essentially resistive, thyristors Q14 and Q16 will each cease conducting at the end of its respective half cycle when the opposing thyristor reverses the driving polarity, attempting to reverse the current through one thyristor. With an inductive load, at the beginning of a half cycle the triggered thyristor is attempting to oppose the actual reactive current which is returning power to the battery. Such a reversed current cannot be supplied through the triggered thyristor. However, during a half cycle, where for example, thyristor Q14 would be conducting if the load were resistive, a prevailing reactive a half cycle, where for example, thyristor Q14 would be conducting if the load were resistive, a prevailing reactive current may instead require a reverse current which is then supplied through diode CR10 to a tap on the transformer (tap 28 of FIG. 1) near that one supplied by thyristor Q14. This reactive current is supplied through inductors L10 and L8, whose inductance prevents high surges and other transients. Also, inductor L8 being a tapped inductor, draws a current from both sides of inductor L6. This splitting of the current moderates disturbances that would be produced by drawing current exclusively from one side of inductor L6.

It is to be appreciated that various modifications and alterations may be implemented with respect to the above described preferred embodiment. For example, various alternate switching devices may be employed instead of thyristors. Also, it is anticipated that the trigger control can be fabricated in various ways employing discrete components, integrated logic circuits, or microcomputers. Moreover, various types of well-known inverters may be substituted for the one disclosed herein. Furthermore, the various filtering circuits included herein can be altered to produce the desired degree of filtering, damping, power loss, etc. While thyristors are shown herein, it is expected that numerous other circuits can be employed to disconnect utility lines from the power supply output lines. For those embodiments which do not require reverse biasing for disconnecting utility lines, the doublers may be deleted. It is also expected that numerous circuit modifications can be implemented and substitute components used to achieve the desired speed, capacity, power handling, accuracy, etc.

Obviously, many modifications and variations of the present invention are possible in light of the above teachings. It is therefore to be understood that within the scope of the appended claims, the invention may be practiced otherwise than as specifically described.

What is claimed is:

1. An uninterruptible power supply operable to supplant a primary power source with a secondary power source when the primary power source fails, said supply comprising:
   a pair of output terminals;
   switching means responsive to the electrical potential of said primary power source for selectively coupling said primary source or said secondary source to said output terminals, said switching means including a pair of switching semiconductors each having a separate control electrode and a pair of switching electrodes; and
   energy storage means coupled to said primary power source and operable to supply energy to said output terminals during the time for switching between said primary power source and said secondary power source;
   wherein said switching means provides a current path from said primary power source to said output terminals which by-passes said secondary power source.

2. An uninterruptible power supply operable to supplant a primary power source with a secondary power source when the primary power source fails, said supply comprising:
   a pair of output terminals;
   switching means responsive to the electrical potential of said primary power source for selectively coupling said primary source or said secondary source to said output terminals, said switching means providing a current path from said primary power source to said output terminals which by-passes said secondary power source; and
   energy storage means coupled to said primary power source and operable to supply energy to said output terminals during the time for switching between said primary power source and said secondary power source;
   wherein said secondary power source comprises,
   a battery,
   inverter means coupling said battery to said output terminals, said inverter means including,
   an electromagnetic device coupled to said output terminals,
   a switching device coupled to said battery for recurrently connecting said battery to said electromagnetic device, and
   clipping means coupled to said electromagnetic device for filtering high amplitude transients therefrom.

3. An uninterruptible power supply according to claim 2 wherein said clipping means comprises:
   a filter having an unidirectional conducting device; and
   a switch for connecting said filter to said electromagnetic device during operation of said means.

4. An uninterruptible power supply operable to supplant a primary power source with a secondary power source when the primary power source fails, said supply comprising:
   a pair of output terminals;
   switching means responsive to the electrical potential of said primary source for selectively coupling said primary source or said secondary source to said output terminals, said switching means including a switching semiconductor having a control electrode and a pair of switching electrodes and providing a current path from said primary power source to said output terminals which by-passes said secondary power source;
   energy storage means coupled to said primary power source and operable to supply energy to said output terminals during the time for switching between said primary power source and said secondary power source; and
   forced commutation means responsive to the voltage of said primary power source for actuating said switching means to decouple said primary power source from said output terminals after a failure of said primary power source, said forced commutation means including,
   a voltage multiplier driven by said primary power source for storing a charge which is multiple of the peak voltage of said primary power source, said primary power source providing an alternating current, and reversing means operable upon failure during a predetermined phase of said primary power source to couple said multiplier to said semiconductor to reverse the voltage across its pair of switching electrodes.

5. An uninterruptible power supply operable to supplant a primary alternating current power source with a secondary power source when the primary power source fails, said supply comprising:
   a pair of output terminals;
   switching means responsive to the electrical potential of said primary power source for selectively coupling said primary source or said secondary source to said output terminals, said switching means providing a current path from said primary power source to said output terminals which by-passes said secondary power source; and
   energy storage means coupled to said primary power source and operable to supply energy to said output terminals during the time for switching between said primary power source and said secondary power source, said energy storing means including,
- a magnetic device connected between said output terminals, and
- a capacitive element coupled in parallel with said magnetic device to form a circuit having a natural frequency tending to sustain the alternations of said uninterruptible power supply at said output terminals.

6. An uninterruptible power supply according to claim 1 or 5 wherein said secondary power source comprises
- a battery,
- inverter means coupling said battery to said output terminals.

7. An uninterruptible power supply according to claim 6 wherein said inverter means is rendered inoperative in response to the presence of electrical energy at said primary power source.

8. An uninterruptible power supply according to claim 6 wherein said inverter means comprises:
- an electromagnetic device coupled to said output terminals; and
- a switching device coupled to said battery for recurrently connecting it to said electromagnetic device.

9. An uninterruptible power supply according to claim 1 or 6 further comprising:
- an inductive element coupled in series circuit relationship between said switching means and said output terminals.

10. An interruptible power supply according to claim 6 wherein said inverter comprises:
- a pulse width modulator for producing from said battery a pulse train whose duty cycle varies periodically.

* * * * *